United States Patent [19]

Turner

[11] Patent Number: 4,871,002
[45] Date of Patent: Oct. 3, 1989

[54] ROUTER FIXTURE

[76] Inventor: Michael T. Turner, 811 E. Street Ext., Victor, N.Y. 14564

[21] Appl. No.: 305,160

[22] Filed: Feb. 2, 1989

[51] Int. Cl.$^4$ ............................................. B27C 5/10
[52] U.S. Cl. ............................ 144/144 R; 144/134 A; 144/137; 144/142; 144/144.5 R; 409/130; 409/182
[58] Field of Search ................ 409/130, 182; 144/137, 144/142, 144.12, 134 A, 144.5

[56] References Cited

U.S. PATENT DOCUMENTS

| | | | |
|---|---|---|---|
| 3,109,466 | 11/1963 | Jones | 144/144 R |
| 4,356,849 | 11/1982 | Fredrickson | 144/144 R |
| 4,579,158 | 4/1986 | O'Meara | 144/144 R |

*Primary Examiner*—W. Donald Bray
*Attorney, Agent, or Firm*—Samuel R. Genca

[57] ABSTRACT

A router fixture for use with a router for trimming an end of a first molding strip to fit a face of another longitudinal molding strip wherein the fixtrue comprises a longitudinal rear guide member for aligning one edge of the first molding strip thereto, a work surface member being fixed to the longitudinal rear guide member at an angle of declination from a given point on said longitudinal rear member for supporting a face of the first molding strip and having a horizontal router support member being mounted above the point on the longitudinal rear guide member and spaced from the face of the work surface member so that the first molding strip may pass beneath the horizontal router support member. The horizontal router support member includes an edge guide transverse to the molding strip so that the cutter of the router is guided across the end of said first molding strip. The router fixture may be equipped with first and second work surface members and first and second horizontal router support members to trim the left or right ends of the molding strips.

9 Claims, 5 Drawing Sheets

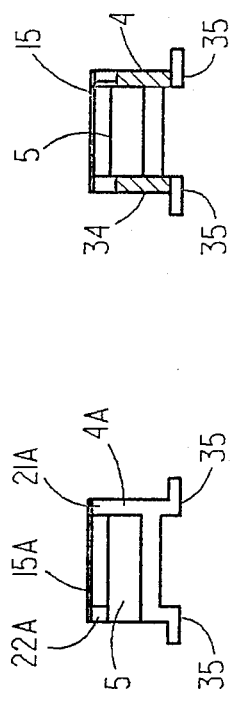
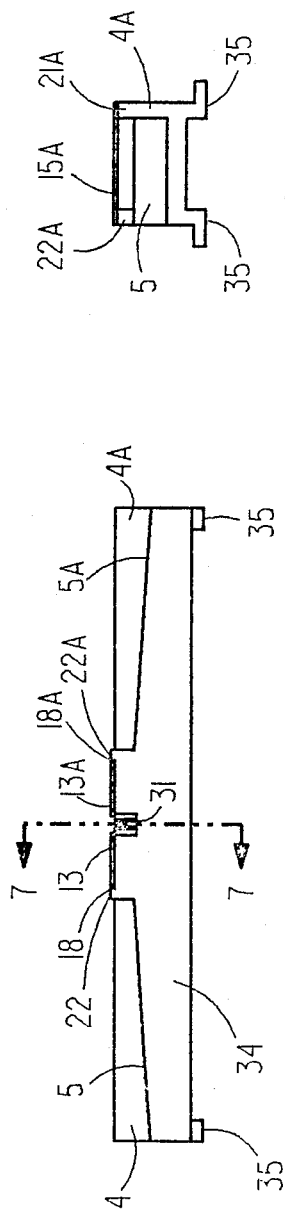
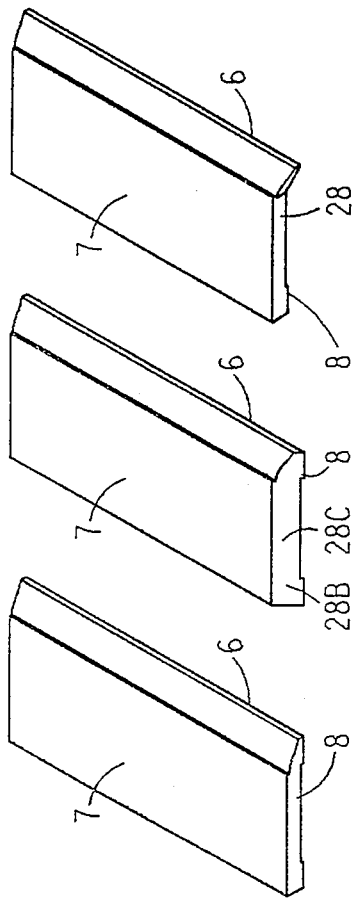
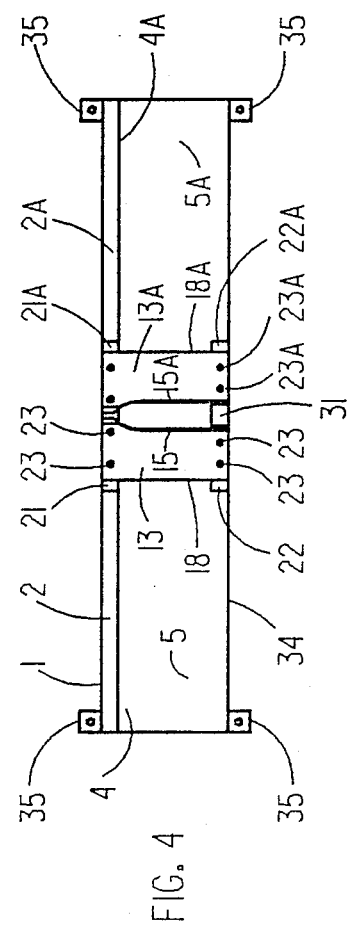

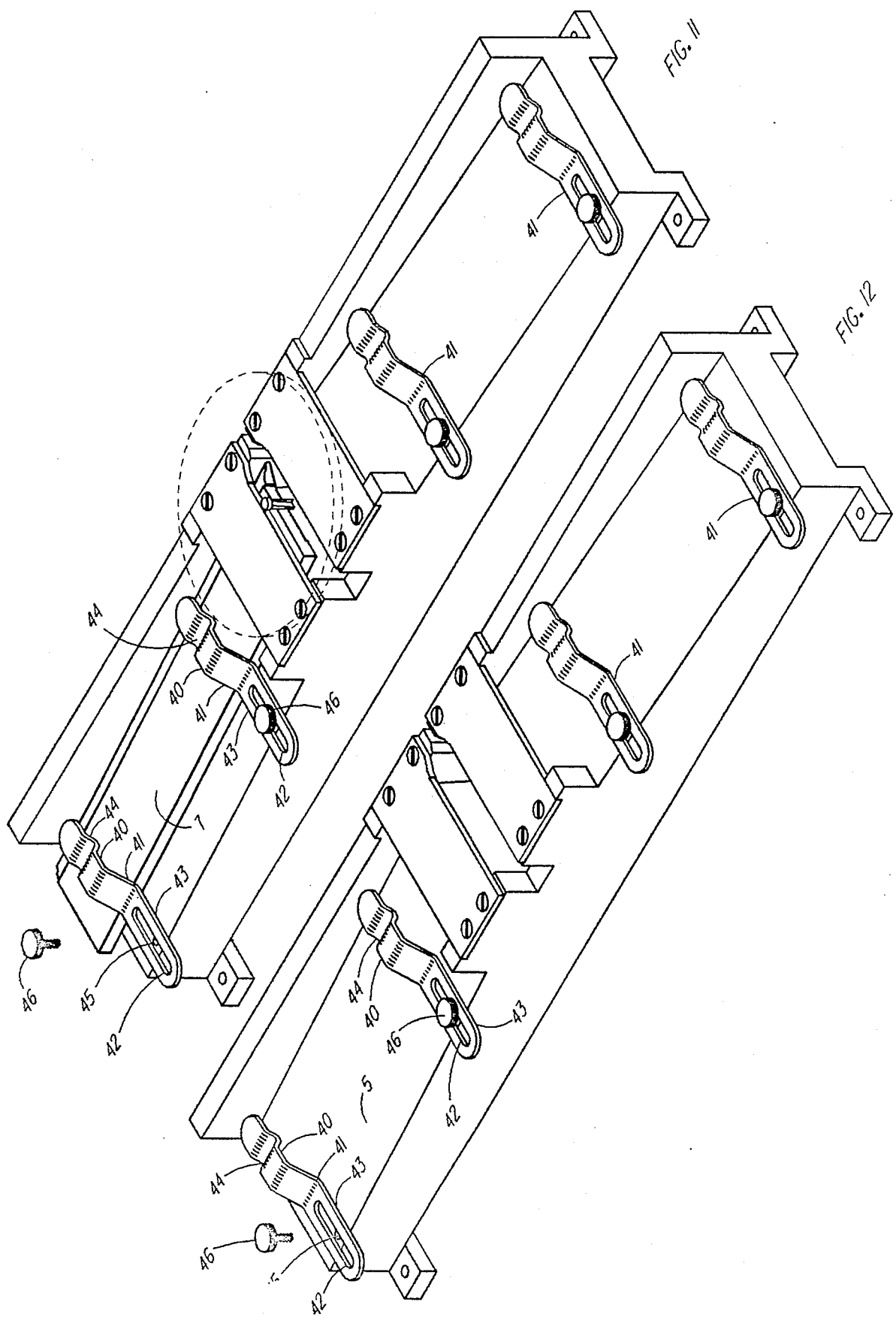

ROUTER FIXTURE

BACKGROUND OF THE INVENTION

The present invention relates to a fixture and more particularly to a router fixture for trimming with a router the end of a molding strip to fit the contour of a face of a corresponding molding strip.

DESCRIPTION OF THE PRIOR ART

The prior art necessitated the cutting of molding with a coping saw or a miter attachment to a circular saw. Although these prior art proved to be satisfactory for their intended purposes, they nevertheless were unsatisfactory in the matters of quality control and high volume production.

SUMMARY OF THE INVENTION

A router fixture for trimming an end of a first molding strip to fit a face of another longitudinal molding strip wherein the router fixture comprises a longitudinal rear guide member for aligning one edge of the first molding strip thereto, a work surface member being fixed to the longitudinal rear guide member at an angle of declination from a given point on said longitudinal rear member for supporting a face of the first molding strip and having a horizontal router support member mounted above the point on the longitudinal rear guide member and spaced from the face of the work surface member. The horizontal router support member includes an edge guide transverse to the molding strip so that the cutter is guided across the end of the first molding strip. If desired, the router fixture may include a mirror image of the fixture just described to cut the other end of the first molding strip to fit the contour or face of another longitudinal molding strip.

BRIEF DESCRIPTION OF THE DRAWING

These and other features of the invention will be understood by reference to the drawing in which:

FIG. 4 shows a top view of a preferred embodiment of the invention shown in FIG. 1;

FIG. 5 shows a front view of the preferred embodiment of the invention shown in FIG. 1;

FIG. 6 shows an end view of the preferred embodiment of the invention shown in FIG. 1;

FIG. 7 shows a sectional end view of the preferred embodiment of the invention shown in FIG. 1;

FIG. 8 shows a perspective view of a molding strip;

FIG. 9 shows a perspective view of a molding strip in which one end is cut at an angle, for example, 45 degrees;

FIG. 10 shows a perspective view of a molding strip end which has been trimmed in the router fixture;

FIG. 11 shows a perspective view of another embodiment of the invention; and

FIG. 12 shows a perspective view of the embodiment of the invention shown in FIG. 11.

DETAILED DESCRIPTION

Figure 1:
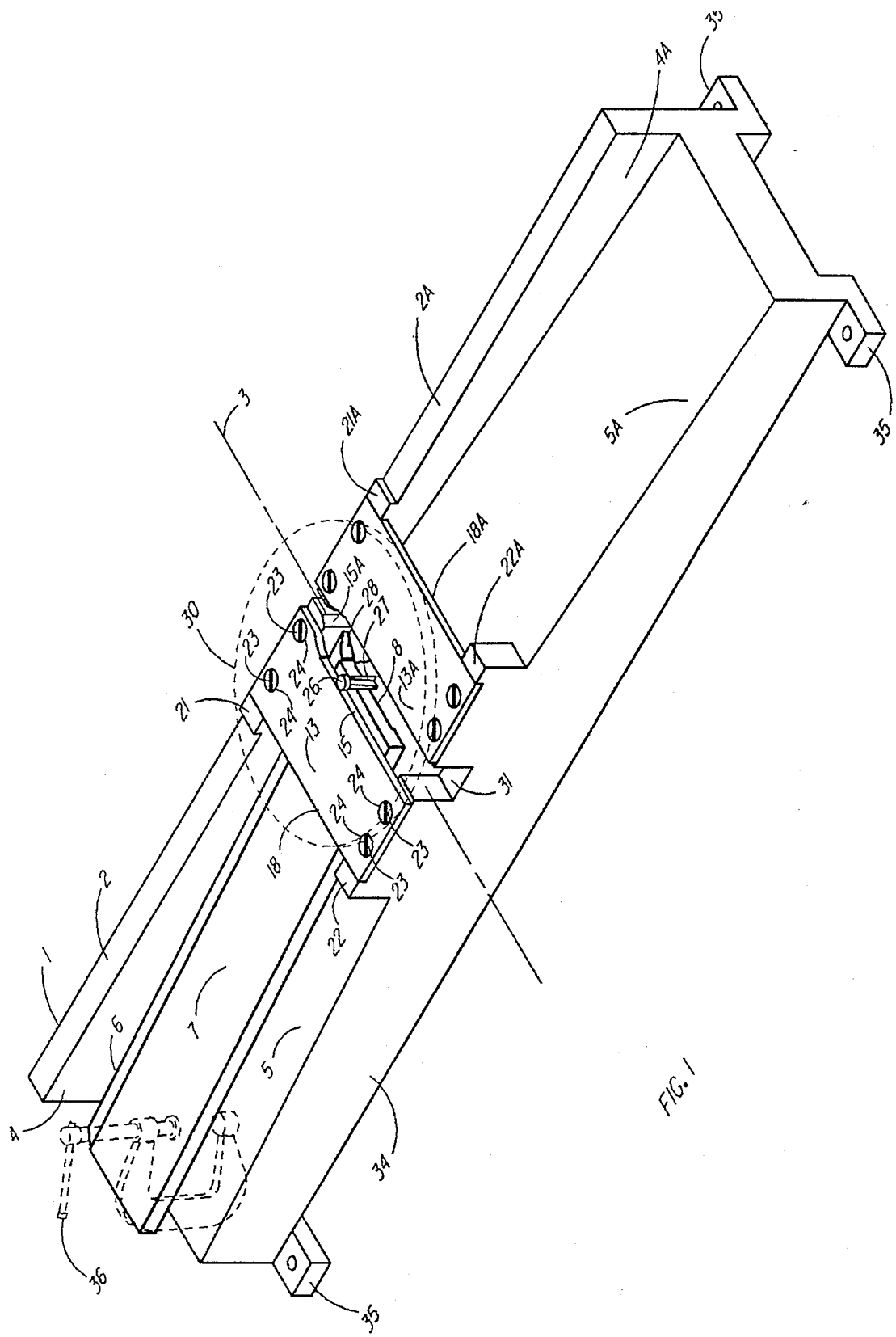
FIG. 1 shows a perspective view of a preferred embodiment of the invention with a molding strip in place being cut by a router cutter.
Figure 2:
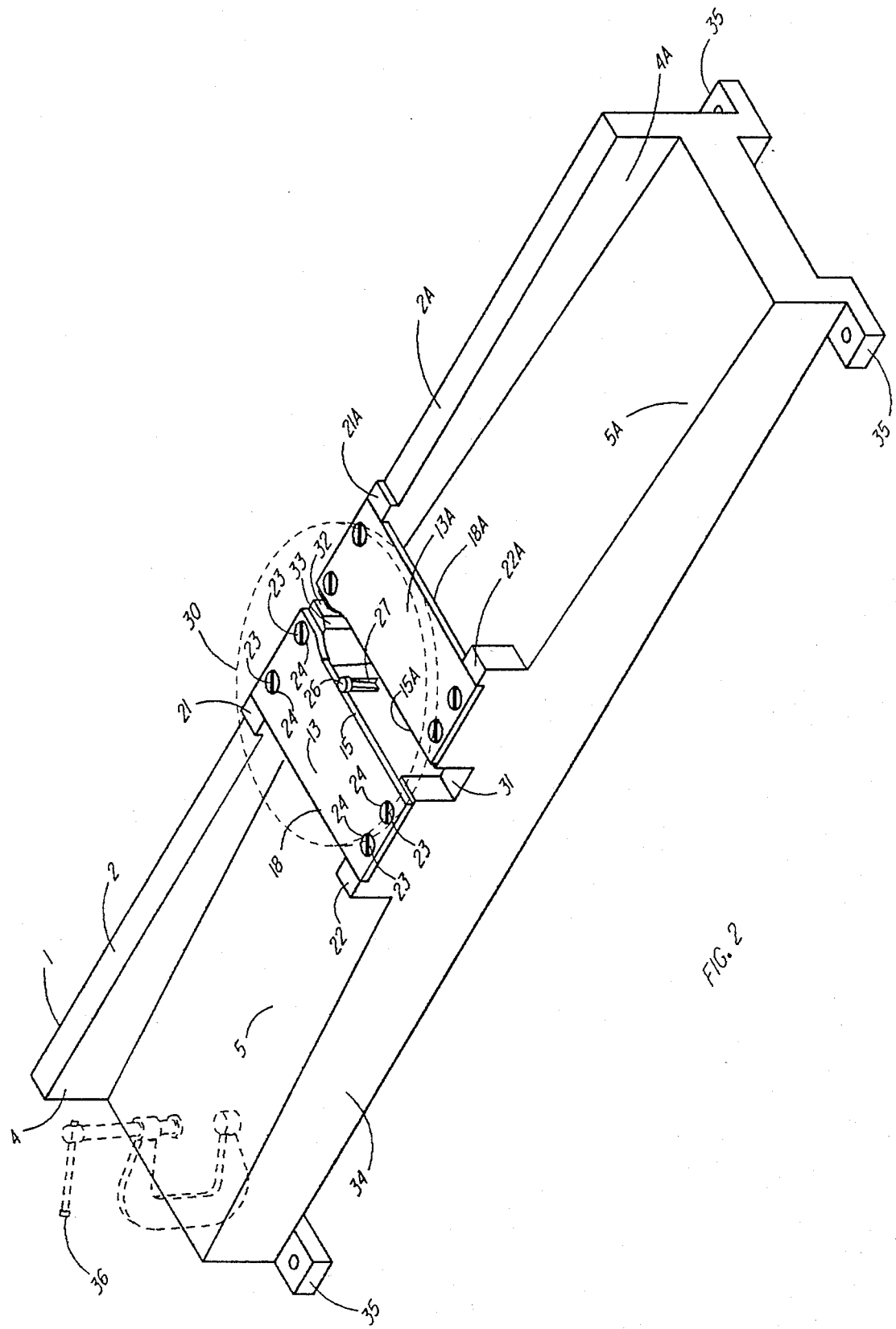
FIG. 2 shows another perspective view of a preferred embodiment of the invention shown in FIG. 1.
Figure 3:
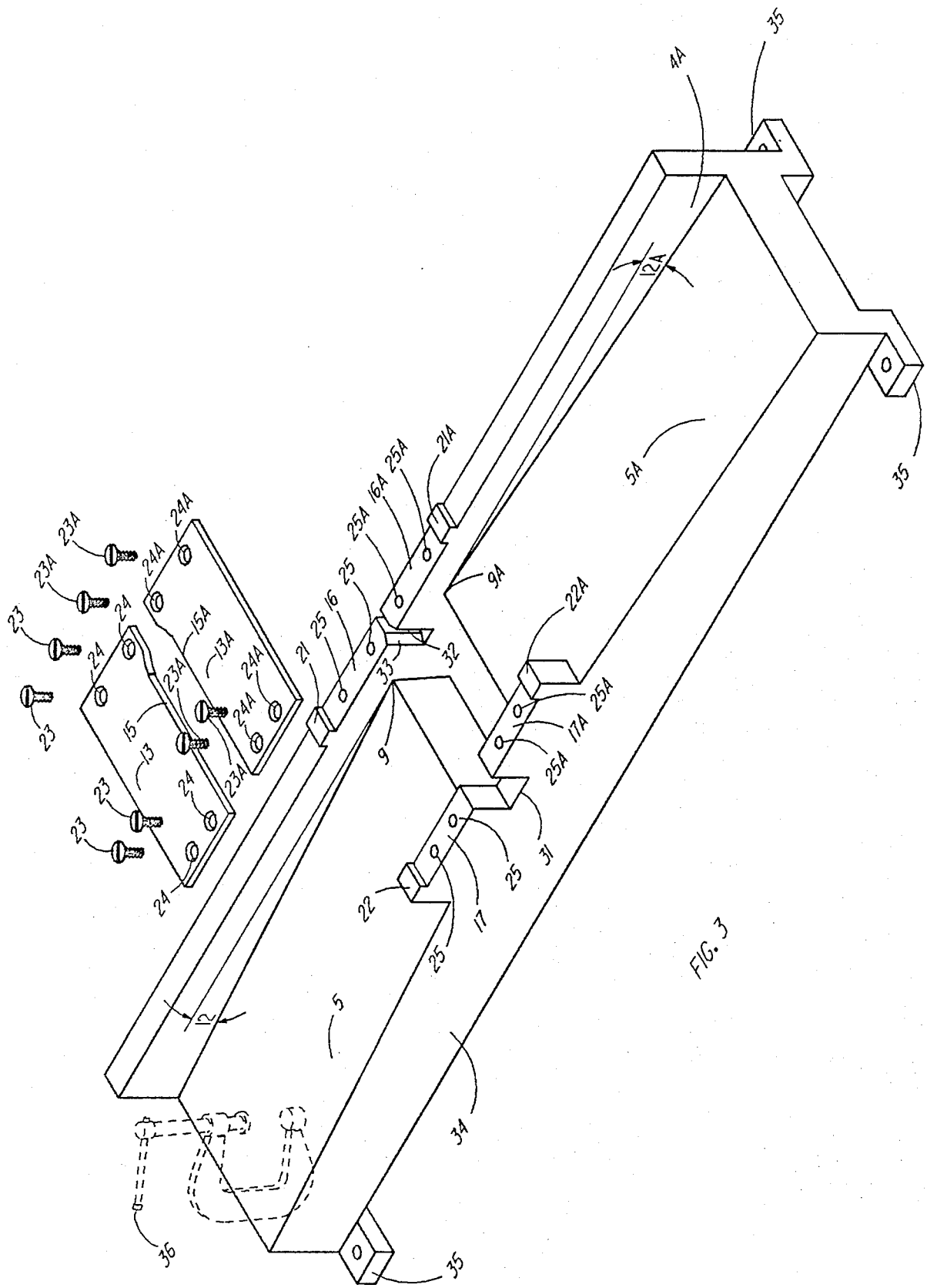
FIG. 3 shows a perspective view of the preferred embodiment of the invention shown in FIG. 1 disassembled.

Referring now to FIGS. 1 through 7 of the Drawing, a router fixture 1 in accordance to a preferred embodiment of the invention is shown. The router fixture 1 is particularly adapted to cut or trim a molding for either a left hand or a right hand cut. It should be noted that since the fixture 1 is for either a left hand cut or a right hand cut, the fixture includes a left hand portion 2 and a right hand portion 2A on each side of the axis 3. The left hand portion 2 and the right hand portion 2A are mirror images of each other and, therefore, the right hand portion elements will have the letter A after each numeral.

Referring again to FIGS. 1 through 7, the router fixture 1 is shown with the left hand portion 2 and the right hand portion 2A about the axis 3. The left hand portion 2 includes the longitudinal rear guide member 4 and the work surface member 5. The longitudinal rear guide member 4 aligns the molding edge 6 of the molding strip 7. The work surface member 5 holds the face 8 of the molding strip 7. The work surface member 5 is fixed to the longitudinal rear guide member 4 at an angle of declination 12 from a given point 9 on the longitudinal rear guide member 4 (See FIG. 3). The angle of declination 12 may be, for example, 5 degrees.

Disposed transversely to the work surface member 5 and the longitudinal rear guard member 4 is a horizontal router support member 13. The horizontal router support member 13 is approximately over the given point 9 and is spaced therefrom sufficiently to slide the molding strip 7 just pass a guide edge 15 of the horizontal router support member 13. The horizontal router support member 13 is supported on a pedestal 16, which is on the longitudinal rear guide member 4 and a diametrically opposed pedestal 17 which lies on the work surface member 5. The horizontal router support member 13 includes a straight edge 18 which is used for aligning the horizontal router support member 13 on stop members 21, 22. The horizontal router support member 13 is fastened to the pedestals 16, 17 by machine screws 23 which extend through clearance holes 24 in the horizontal router support member 13 and into threaded holes 25. The horizontal router support member 13 is easily replaced or changed to put on a different type of horizontal router support member 13 for a different type of molding 7. As may now be seen, the straight edge 18 may be aligned with the stop members 21, 22. The edge guide 15 cooperates with the roller 26 so that the cutter 27 cuts or trims the molding end 28 of the molding strip 7. The edge guide 15 of the horizontal router support member 13 may be easily changed by replacing the horizontal router support member 13 with a different horizontal router support member (not shown). The roller 26, together with the cutter 27, is actually a part of a router which is shown by the dotted dash lines 30.

To provide the necessary clearance for the roller 26 and the cutter 27, a rectangular notch at 31 next to pedestal 17 and another rectangular notch is provided at 32 which is next to pedestal 16. Notch 32 includes a cutaway portion 32 which communicates with the notch 32. As can be seen, the fixture 1 is cut away on the front face 34 so as to expose the molding strip 7 therein. It should be noted that it is not necessary to cut the fixture 1 away since only one longitudinal rear guide member 4 is necessary to practice the invention.

The fixture 1 includes four mounting lugs 35 for mounting the fixture 1 on a table or bench (not shown).

The molding strip 7 may be clamped to the work surface member 5 by a "C" clamp 36. However, it should be remembered that other clamping arrangements may be used without departing from the invention. For example, in FIGS. 11 and 12, spring type clamps 50 are used.

The right hand portion 2A of FIG. 1 includes a longitudinal rear guide member 4A for aligning the edge 6 of the molding strip 7 and a work surface member 5A. The work surface member 5A is fixed to the longitudinal rear guide member 4A at an angle of declination 12A from a given point 9A on the longitudinal rear guide member 4A for supporting a molding strip 7. The angle of declination 12A is approximately 5 degrees.

A pedestal 16A is fixed to the longitudinal rear guide member 4A and diametrically opposite the pedesal 16A is another pedesal 17A which is fixed to the work surface member 5A disposed transversely to the work surface 5A and a longitudinal rear guide member 4A is a horizontal router support member 13A. The horizontal router support member 13A is approximately over the given point 9A and is based therefrom sufficient to slide the molding strip 7 just past a guide edge 15A of the horizontal router support member 13A. The horizontal router support member 13A is supported on the pedestal 16A and a diametrically opposed pedestal 17A which lies on the work surface member 5A. The horizontal support member 13A includes a straight edge 18A which is used for aligning the horizontal router support member on stop members 21A and 22A. The horizontal router support member 13A is fixed to the pedestals 16A and 17A by machine screws 23A which extend through clearance holes 24 in the horizontal support member 13A and into threaded holes 25A. The horizontal router support member 13A is easily replaced or changed to put on a different type of horizontal router support member 13A for a different type of molding not shown. As may now be seen the straight edge 18A may be aligned with the stop members 21A and 22A. The edge guide 15A cooperates with the roller 26 so that the cutter 27 cuts or trims the molding end not shown of the molding strip 7. The edge guide 15A of the horizontal router support member 13A may be easily changed or replaced with a different horizontal router support member not shown. As was previously stated the roller 26 together with the cutter 27 is actually a part of the router which is shown by the dotted/-dashed lines 30.

It may know be seen that the right hand portion 2A of the router fixture is an identical mirror image of the left-hand portion 2A.

Before discussing the operation of the router fixture attention is respectfully directed to FIGS. 8 through 10. FIG. 8 shows a typical molding which in this in case is a colonial type floor molding which includes faces 7 and 8 and an edge 6. FIG. 9 shows that the molding end 28B has been cut at an angle so as to provide a surface 28C to be cut by the cutter 27. FIG. 10 shows the finished product which has been cut or trimmed back by the roller 26 and cutter 27 in the router fixture 1 as will now be explained.

Referring to FIG. 1, the molding strip 7 is placed on the work surface 5 and the edge 6 moves toward the longitudinal rear guide member 4 until the edge 6 strikes the longitudinal rear guide member 4 and then the molding strip 7 is moved upwards until it passes the edge guide 15. The molding strip 7 is then clamped to the work surface 5 by the C-clamp 36. The router, not shown, except for the roller 26 and cutter 27, is pressed against the edge guide 15 and moved along thereto while the router 30 is pressed against the router support member 13. While the router 30 is being energizsed, the cutter 27 rotates and is guided by the roller 26 on the edge guide 15. Since the cutter 27 is perpendicular to the router 30, the edge 28 is cut at a slight angle on the face 28, while the roller 26 follows the contour of the edge guide 15. After the cutter 27 passes across the notch 33 and into the opening 32 between the pedestals 16 and 16A, the cut is complete. The molding strip 7 is removed by releasing the C-clamp 36.

The router fixture 1 may be used on the right hand portion 2A in a manner just explained for the left-hand portion 2.

FIGS. 11 and 12 show a means 40 for clamping the molding strip 7 to the router fixture 1 in either the left hand portion 2 or the right hand portion 2A.

The means 40 includes a bracket 41 having an elongated opening 42 along a flattened portion 43 with a "V" shaped portion 44 resting on the molding strip 7. The bracket 41 is screwed to the work surface member 5 in tapped holes 45 by screws 46 to hold the molding strip 7 in place. Two brackets 41 are used in the left hand portion 2 and two brackets 41 are used in the right hand portion 2A. The two brackets 41 are evenly spaced on the left-hand portion 2 and on the right-hand portion 2A. Other types of clamping means may be employed without departing from the invention. For example, the molding strip 7 may be clamped by a modified C-clamp not shown.

It is to be understood that while certain forms of the present invention have been illustrated and described herein, it is not to be limited to the specific forms or arrangements of parts described and shown.

What is claimed is:

1. A fixture for use with a router for trimming an end of a first molding strip to fit against the corresponding face of another molding strip, said fixture comprising:
    (a) a longitudinal rear guide member for aligning one edge of said first molding strip thereto;
    (b) a work surface member being fixed to said longitudinal rear guide member at an angle of declination from a given point on said longitudinal rear guide member for supporting a face of said first molding strip thereon;
    (c) a horizontal router support member being mounted above said given point on said longitudinal rear guide member,
    (i) said horizontal router support member having an edge guide for guiding a cutter of said router across said end of said first molding strip; and
    (d) a means for fixing said horizontal router support member transverse to said work surface member and said longitudinal rear guide member for trimming said end of said first molding strip.

2. The invention defined in claim 1 wherein said horizontal router support member having said edge guide and a straight edge opposite to said edge guide for mounting for mounting said horizontal router support member with said means for fixing said horizontal router support member transverse to said work surface member and said longitudinal rear guide member for trimming said end of said first molding strip.

3. The invention defined in claim 1 wherein said angle of declination is approximately 5 degrees.

4. The invention defined in claim 1 wherein said horizontal router support member is mounted over said given point on said longitudinal rear guide member and a projection of said point to said horizontal router support member is at approximately the center of said horizontal router support member.

5. A fixture for use with a router for trimming an end of a first molding strip to fit against a corresponding face of another molding strip, said fixture comprises:
  (a) a longitudinal rear guide member for aligning one edge of said first molding strip thereto;
  (b) a work surface member being fixed to said longitudinal rear guide member at an angle of declination from a given point on said longitudinal rear guide member for supporting a face of said first molding strip thereon;
  (c) first and second support members
    (i) said first support member being fixed to said longitudinal rear guide member above said point;
    (ii) said second support member being fixed to said work surface member a given distance from said first support member so that said first molding strip lies therebetween; and
  (d) a horizontal router support member being fixed to said first and second support members;
    (i) said horizontal router support member having an edge guide for guiding a cutter of said router across said end of said first molding strip.

6. The invention defined in claim 5 wherein said horizontal router support member having a straight edge opposite to said edge guide for mounting said horizontal router support member with said first and second support members.

7. The invention defined in claim 5 wherein said angle of declination is approximately 5 degrees.

8. The invention defined in claim 5 wherein said horizontal router support member is mounted over said given point on said longitudinal rear guide member and a projection of said point to said horizontal router support member is at approximately the center of said horizontal router support member.

9. A fixture for use with a router for trimming an end of a first molding strip or a second molding strip to fit against the corresponding face of another molding strip, said fixture comprising:
  (a) a longitudinal rear guide member, having a first side and a second side, for aligning first and second edges of said first and second molding strips thereto;
  (b) first and second work surface members being fixed to said first and second portions of said longitudinal rear guide member at angles of declination from first and second given points on said longitudinal rear guide member for supporting first and second faces of said first and second molding strips thereon;
  (c) first and second horizontal router support members being mounted above said given points on said longitudinal rear guide member,
    (i) said horizontal router support member, each having edge guides diametrically opposed to each other, for guiding a cutter of said router across said first and second ends of said first and second molding strips; and
  (d) a means for fixing said horizontal router support members transverse to said work surface members and said longitudinal rear guide members for trimming said ends of said first and second molding strips.

* * * * *